Dec. 22, 1953
R. E. SIMPSON
2,663,866
ILLUMINATED DRINKING GLASS
Filed Aug. 23, 1951
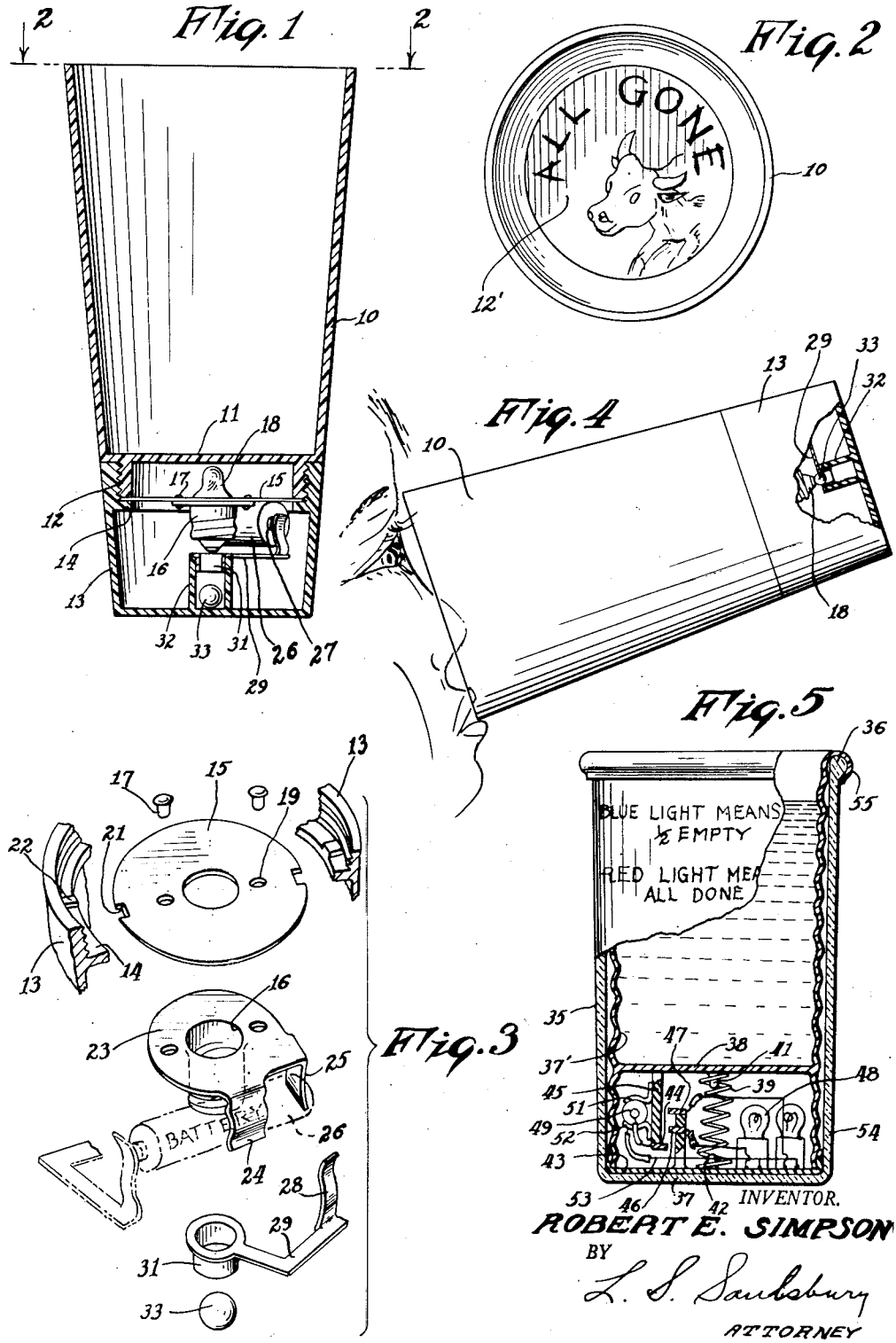
INVENTOR.
ROBERT E. SIMPSON
BY
L. S. Saulsbury
ATTORNEY Patented Dec. 22, 1953

2,663,866

UNITED STATES PATENT OFFICE 2,663,866

ILLUMINATED DRINKING GLASS

Robert E. Simpson, New Rochelle, N. Y.

Application August 23, 1951, Serial No. 243,193

1 Claim. (Cl. 340—232)

This invention relates to a drinking glass having illuminated bottom attachment.

It is an object of the present invention to provide an illuminated bottom attachment for a drinking glass that is operable upon the drinking glass being tilted to empty the contents thereof as when the child is drinking from the glass to be lighted and to convey to the child a picture.

It is another object of the invention to provide a drinking glass for a child which will stimulate complete consumption of the contents of the glass.

It is another object of the invention to provide a luminated indicating device in a glass so as to have two light indications of different color to be operated in sequence to indicate first that the glass is one-half empty and thereafter to indicate that the glass is completely empty.

Other objects of the invention are to provide an illuminated attachment for drinking glasses operable as the glass is tilted to empty the contents, which is of simple construction, inexpensive to manufacture, sanitary, easy to attach and detach from the glass, compact, durable, of pleasing appearance and efficient in operation.

For a better understanding of the invention, reference may be had to the following detailed description taken in connection with the accompanying drawing, in which:

Fig. 1 is a vertical sectional view of the drinking glass with the light attachment therefor secured in place on the bottom end of the glass.

Fig. 2 is a top planed view of the glass.

Fig. 3 is a fragmentary, perspective and collective view of the parts which make up the light attachment, and adapted to retain the battery and lamp bulb.

Fig. 4 is a side elevational view of the drinking glass with the attachment thereon and raised to a tilted position to empty the same and with the bottom portion of the attachment broken away to show the ball elevated for contact with the lamp bulb in order to cause the bottom of the glass to be illuminated.

Fig. 5 is a side elevational view of a modified form of glass with a portion broken away and shown in section, this form of the invention being adapted to give two different light indications, one when the glass is half empty and the other when the glass is fully empty.

Referring now particularly to the Figures 1 to 4 inclusive, 10 represents a tumbler having a bottom 11 and a depending inverted portion 12. This tumbler is made of glass or plastic and is transparent or frosted in the bottom. On the under face of the bottom 11 there can be printed a picture or other data which will appear to be of interest to one who consumes the contents of the glass. This may be advertising data or else may be something of amusement to a child in order to encourage his partaking of the contents of the glass. Such a picture is indicated at 12' in Fig. 2. This picture may be on the bottom of the glass or it may be a separate picture or label that can be applied to the bottom of the glass.

The illuminating device comprises a cup-shaped member 13 which has threaded thereon for engagement with the threads of the depending strip portion 12. This cup-shaped member 13 has radially inwardly extending shoulder 14 on which a supporting plate 15 for lamp socket 16 is secured by rivets 17. This socket 16 will contain a lamp 18. This plate 15 has holes 19 for securing the rivets and diagonally opposite slots 21 which receive projections 22 on the inwardly extending flange 14 of the member 13.

The socket 16 has a flange 23 through which the rivets 17 extend. The flange 23 has depending clip portions 24 and 25 for holding a battery 26 against the socket 16 when the battery is stripped of paper insulation, the bare casing will engage with the socket 16 to establish a circuit from one terminal of the battery with the socket. The positive terminal of the battery is indicated at 27 and will be engaged by a clip portion 28 on an arm 29 that is supported from a sleeve formation 31 which can be fitted into the upper end of a sleeve formation 32 rising from the bottom of the cup-shaped member 13. The body of the cup-shaped member and the sleeve formation 32 is preferably formed of plastic, glass or other insulating material. A ball 33 can move in the sleeve formation 32 and in the portion 31 of the positive contact establishes a circuit between the positive contact or terminal with the bottom of the lamp so that the light 18 will be turned on and the picture indicated at 12' will be clear to the user of the glass to indicate that the bottom of the glass has been found. The attachment will have a tight connection with the bottom of the cup 10 so that it will be prevented from being harmed by moisture or liquid that might in any way short circuit the electrical connections or cause them to deteriorate. At times when the glass is to be cleaned, the attachment can be separated from the end thereof, and the glass can be cleaned in the usual manner and allowed to dry before the attachment is fixed again thereto.

In Fig. 5, there is shown an arrangement whereby an indication will be made when the contents have been half-emptied from the tumbler and also later another indication will be made when the tumbler has been fully emptied. According to this form of the invention, 35 represents a tumbler of glass or plastic which has a top enlarged rim 36 and a bottom 37. Fitted within the glass 35 is a Sylphon device 37' which is adjustable to be extended or to be lifted. This device 37' has a partition 38 near the bottom or the bellows which is supported by a spring 39 extending between a depending pin 41 on this partition 38 and a pin 42 on a bottom cover 43 whereby to lift the partition as the contents are removed. When the partition 38 is lifted the contact terminal 44 on a depending bracket 45 will engage consecutively contacts 46 and 47. Contact 46 is connected with a lamp 48 so that upon the contact 44 engaging with the contact 46 the light circuit will be established through a battery 49 carried by the depending bracket 45 by means of clips 51 and 52 and which has the wire 53 leading from one of the contacts, 52, to the lamp 48 and also to a second lamp 54. The lamp 54 is connected to the terminal 47 so that upon the contents being completely removed from the collapsible container 37, the spring 39 will elevate the contact 44 so that it engages the contact 47 and thereby will turn on the light 54. The spring 39 is of sufficient strength to lift the part 38 with the contents partly filling the same for the first contact 46 and thereafter lifting the partition 38 after the contents have been removed, and so that the contact 44 will engage contact 47. It will thus be seen that one indication can be given when the contents have been half taken from the drinking tumbler, that is a blue light 48 can be used, and thereafter a red light 54 will be turned on when the contents have been finally removed from the cup.

The top part of the collapsible inner container 37' is turned over and secured to the enlarged top rim 36, in a manner as indicated at 55.

It should now be apparent that there has been provided an attachment for a drinking glass which will illuminate the bottom of the tumbler automatically as the tumbler is turned up to remove the contents therefrom. It will be seen that this will encourage the drinking of the contents of the tumbler. It will have particular use with children to encourage their drinking of their liquid food and also to encourage too the drinking of other fluids.

While various changes may be made in the detailed construction, it shall be understood that such changes shall be within the spirit and scope of the appended claim.

I claim:

An illuminating attachment for tumblers, providing a body member having means for the attachment of the same to the bottom of a tumbler, said body member being of cup shape and having an upstanding bottom sleeve projection, said body member having an inwardly extending flange, a plate adapted to be supported by the flange, a lamp bulb socket connected to the plate, said plate having a central opening to provide access to the socket, a lamp bulb fitted into the socket, a contact member having a sleeve projection adapted to enter the top end of the bottom sleeve portion, said sleeve portion of the contact member being vertically aligned with the socket and with the lamp bulb, said lamp bulb having a bottom contact, a ball operable in the bottom sleeve projection and adapted to extend through the sleeve portion of the contact member to engage with the bottom contact of the lamp bulb as the tumbler with the attachment is inverted, said contact member having a horizontal arm and upstanding clip portion thereon, said socket having a flange with depending clip portions for retaining the battery against the socket, said upstanding clip portion of the contact member being engageable with an end terminal of the battery.

ROBERT E. SIMPSON.

References Cited in the file of this patent

UNITED STATES PATENTS

| Number | Name | Date |
|---|---|---|
| 2,118,320 | McEwen | May 24, 1938 |
| 2,118,900 | Schade | May 31, 1938 |